US006749177B2

(12) United States Patent  
Handke et al.

(10) Patent No.: US 6,749,177 B2  
(45) Date of Patent: Jun. 15, 2004

(54) DAMPING VALVE FOR A SHOCK ABSORBER

(75) Inventors: Günther Handke, Euerbach (DE); Günther Braun, Geldersheim (DE); Peter Wirth, Schonungen (DE); Gerald Fenn, Poppenhausen (DE)

(73) Assignee: ZF Sachs AG, Schweinfurt (DE)

( * ) Notice: Subject to any disclaimer, the term of this patent is extended or adjusted under 35 U.S.C. 154(b) by 17 days.

(21) Appl. No.: 10/308,599

(22) Filed: Dec. 3, 2002

(65) Prior Publication Data

US 2003/0111632 A1 Jun. 19, 2003

(30) Foreign Application Priority Data

Dec. 6, 2001 (DE) .......................................... 101 59 936

(51) Int. Cl.[7] .................................................. F16F 9/34
(52) U.S. Cl. .............. 251/337; 188/322.15; 188/322.22
(58) Field of Search ................................ 251/337, 333; 188/322.15, 322.18, 322.22

(56) References Cited

U.S. PATENT DOCUMENTS

| 4,423,800 | A | * | 1/1984 | Kobiske et al. | 251/337 |
| 4,899,855 | A | * | 2/1990 | de Carbon | 251/333 |
| 5,615,756 | A | * | 4/1997 | Grundei et al. | 188/322.15 |
| 5,785,160 | A | * | 7/1998 | Grundei | 188/322.15 |
| 5,937,976 | A | * | 8/1999 | Grundei | 188/322.15 |
| 6,540,052 | B2 | * | 4/2003 | Fenn et al. | 188/322.15 |

FOREIGN PATENT DOCUMENTS

| DE | 1 924 668 | 9/1965 | |
| DE | 1 249 100 | 8/1972 | B60G/13/08 |
| DE | 91 03 749.9 | 8/1991 | |
| DE | 44 10 996 | 6/1995 | F16F/9/32 |
| GB | 634642 | 3/1950 | |

* cited by examiner

Primary Examiner—John Bastianelli  
(74) Attorney, Agent, or Firm—Cohen, Pontani, Lieberman & Pavane

(57) ABSTRACT

Damping valve for a shock absorber includes a damping valve body with at least one valve seat surface for a valve disk which is loaded in the lifting direction by a flow of damping medium. At least one support disk arranged on the valve disk determines, by its contour, a lever arm up to an effective surface to which pressure is applied by a damping medium in the lifting direction, and this support disk is pretensioned in direction of the valve disk by a tensioning plate, wherein the damping valve body forms a line of tensioning with the valve disk, support disk and tensioning plate, wherein at least one of the contact surfaces within the line of tensioning is profiled, so that there is a contact circle at the support disk, and the radius of the contact circle matches the provided reference dimension for the contour of the support disk determining the lever arm length. The profile contains a free cut that accommodates any inaccuracies in the shape of the structural component parts contained in the line of tensioning.

7 Claims, 2 Drawing Sheets

DAMPING VALVE FOR A SHOCK ABSORBER

BACKGROUND OF THE INVENTION

1. Field of the Invention

The invention is directed to a damping valve, particularly for a shock absorber, including a damping valve body with at least one valve seat surface for a valve disk, and a support disk arranged on the valve disk. The support disk has a contour which determines a lever arm up to an effective surface to which pressure is applied to the valve disk by a damping medium, and is pretensioned toward the valve disk by a tensioning plate.

2. Description of the Related Art

A valve disk which is lifted from a valve seat surface by a flow of damping medium is very often used particularly in damping valves for shock absorbers. The effective damping force changes depending upon the length of the lever arm from the damping medium flow to the point of fixation. Comprehensive tests have shown that changes in length in the lever arm of 0.1 mm have drastic effects upon the measured damping force. The valve disk is generally pretensioned in direction of the valve body by at least one annular support disk. Considering that, realistically, the valve seat surface has a certain degree of unevenness, the valve disk is subject to deviations in shape, e.g., during a stamping process, and the tensioning member which pretensions the valve disk on the valve body is also certainly subject to tolerances, the lever arm length mentioned above can not be determined with the desired accuracy. The arrangement of a valve disk with a tensioning element is known, e.g., from DE 44 10 996 C1, to which U.S. Pat. No. 5,615,756 corresponds. The special construction of the piston in the above-cited reference is completely unaffected by the set of problems relating to the fixation of the valve disk and also occurs when the valve bodies are produced by cutting or casting.

Two approaches have been used to solve this problem. First, the tolerances of the individual part were limited to a minimum. In this connection, the permissible surface roughness was also limited because even scoring within the line of tensioning of the valve disk has an influence on the length of the lever arm. Further, parts with a determined dimensional deviation of an impermissible amount were combined with other parts whose tolerance errors were compensated by the former parts. This procedure requires very extensive stocking.

SUMMARY OF THE INVENTION

It is the object of the present invention to minimize the deviation in damping force with respect to a desired damping force characteristic in a damping valve.

According to the invention, this object is met in that at least one of the contact surfaces within the line of tensioning is profiled, so that there is a contact circle at the support disk and the radius of the contact circle matches the provided reference dimension for the contour of the support disk determining the lever arm length. The profile contains an unguided cut or free cut that accommodates any inaccuracies in the shape of the structural component parts contained in the line of tensioning.

As a result of this step, the valve disk can now be fixed in a precise manner with respect to diameter, which greatly facilitates maintaining the desired damping force characteristic. The influence exerted by the quality of the surface was reduced to a very great extent by the transmission of force at the contact circle, so that it was possible to manufacture the structural component points in a less refined manner.

In this connection, it is provided that the profile is carried out within the clamping plate or tensioning plate. The tensioning plate offers the most favorable preconditions for shaping the profile, since the valve body can be maintained as a standard part and the support disk is often only very thin.

In a further advantageous construction, the profile is cone-shaped. The support disks have a diameter which is graduated in a defined manner for different damping force characteristics. Depending on the direction in which the cone extends, a cone profile ensures that the inner or outer edge always contacts the profile in the predetermined manner regardless of the diameter ratios of the support disks that are used.

A particularly favorable clamping state of the utilized disks is achieved when the cone angle is less than 1°. Based on in-house tests, the optimum for the cone angle is achieved from approximately 15' to 30'. The cone angle depends on the material used for the disks. With a small cone angle of this type, because of the contact circle, in spite of the theoretical line contact, an area contact takes place between the utilized disks which has a positive result on the life of the damping valve.

Further, the tensioning plate forms a stop surface for the at least one valve disk.

It has turned out to be very advantageous when the tensioning plate is produced according to a onetime shaping production method, particularly a sintering method. The desired small cone angle can be obtained more easily.

In addition, the tensioning plate on the side remote of the valve disk can be constructed as a spring plate. The profiled side of the tensioning plate can barely be detected with the naked eye. This could lead to difficulties during assembly. A spring plate can be detected more easily in either manual or automated assembly, so that incorrect installation positions are avoided.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
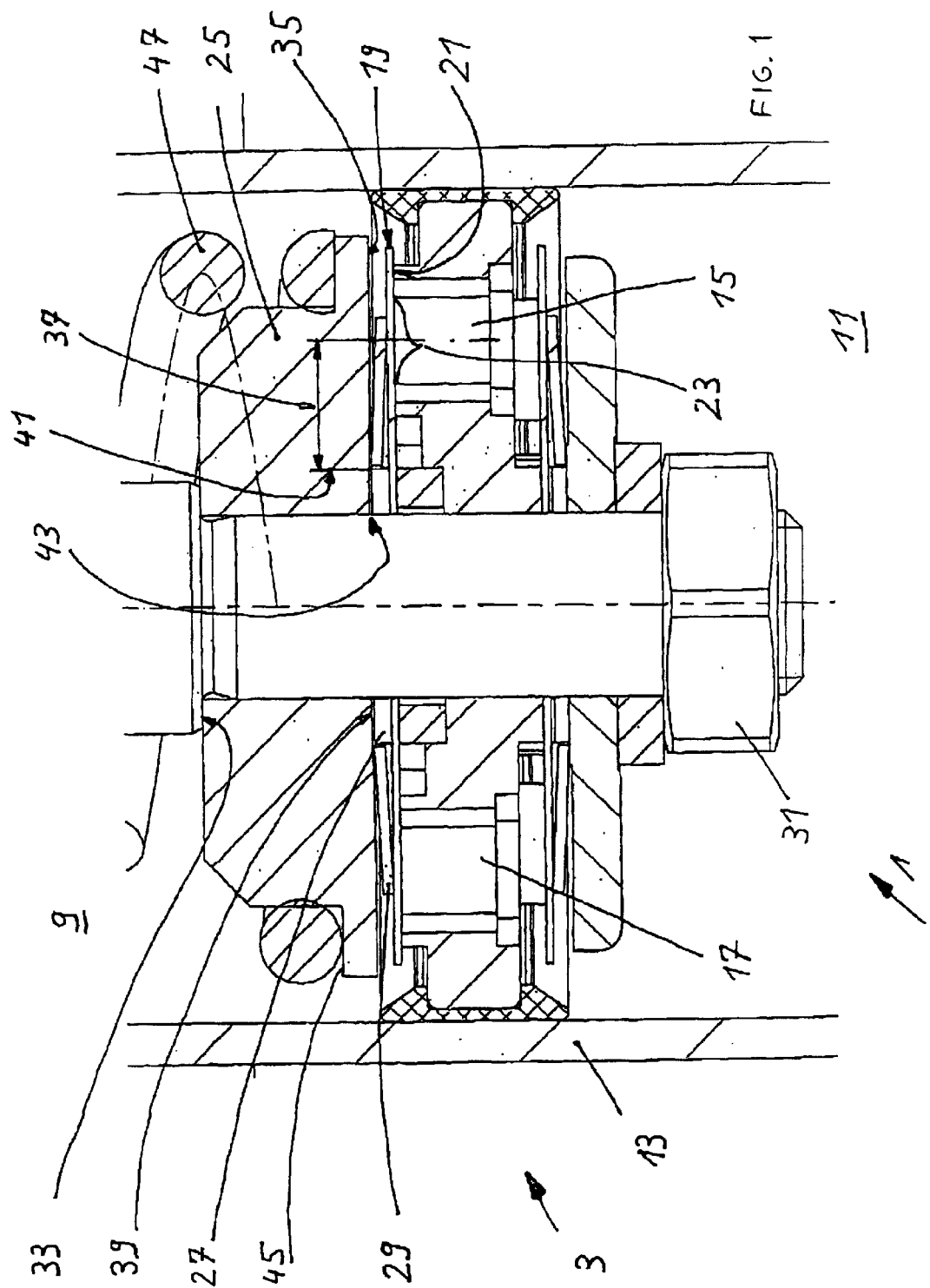
FIG. 1 is a section view showing a damping valve of a shock absorber.

FIG. 1 shows a damping valve 1 inside a shock absorber 3. A valve body 7 constructed as a piston is centered at a piston rod journal 5 and separates two work spaces 9; 11 from one another. The work spaces are filled with a damping medium. A seal 8 is fitted between the valve body 7 from an outer sleeve 13.

The valve body has a quantity of through-flow channels 15; 17 which are at least partially covered at the ends by at least one valve disk 19 on a valve seat surface 21. The surfaces in the lift direction of the valve disk which are acted upon by damping medium present cover surfaces 23 of the valve disk 19 on the through-flow channels 15; 17.

The valve disk 19 is centered at its inner diameter by the piston rod journal 5. A support disk 27 is arranged in the area of the inner diameter in direction of a tensioning plate 25. The support disk centers a plate spring 29 which pretensions the valve disk in direction of the valve seat surfaces. The tensioning plate 25, support disk 27 and valve body 7 are clamped by a journal nut 31. The tensioning plate 25 is supported at a shoulder 33 of the piston rod journal 5. The components between the nut 31 and the should 33 form a bracing circuit.

The valve disk can deform elastically against the force of the plate spring because of the damping medium pressure on the surface 23, the tensioning plate having a stop surface 35 for the valve disk 19. In this connection, a lever arm 37 which is calculated from the difference in radius between the center of pressure of the surface 23 to which pressure is applied, herein after the partial circle, and the outer contour of the support disk 27 is of decisive importance. In order to maintain the lever arm as exactly as possible, a contact surface 39 of the tensioning plate 25 has a profile in the direction of the support disk, so that there is a contact circle 41 which is as closely identical as possible to the desired end point of the lever arm. A free cut 43 forming a cone-shaped profile on the tensioning plate 25 proceeds from the rod journal and forms the contact circle 41 where it contacts the support disk. In this embodiment example, the through-flow channels are located on the partial circle, which is of greater diameter than the contact surfaces of the structural component parts inside the bracing circuit. Therefore, the profile extends radially inside the contact circle. However, when the through-flow channels lie on a partial circle that is smaller than the contact circle, the profile extends on the radial outer side of the contact circle. The cone angle of the profile is less than 1°, preferably about 15'–30'. Regardless of the dimensional deviations of the support disk 27 or of the valve disk 19, the tensioning plate always contacts the diameter—in this example, the outer diameter—of the support disk 27 which determines the reference dimension for the length of the lever arm at the valve disk 19. All of the occurring deviations in measurement are accommodated by the free cut. The comparatively small cone angle ensures that after the clamping of the structural component parts inside the line of tensioning from the journal nut to the shoulder of the piston rod journal there is area contact between the tensioning plate, support disk and valve disk.

The cone angle can therefore be maintained because the tensioning plate is produced by a single shaping step. The sintering method is particularly preferable because there is no need for mechanical reworking of the contact surface and the cone angle nevertheless has the required accuracy.

Figure 1A:
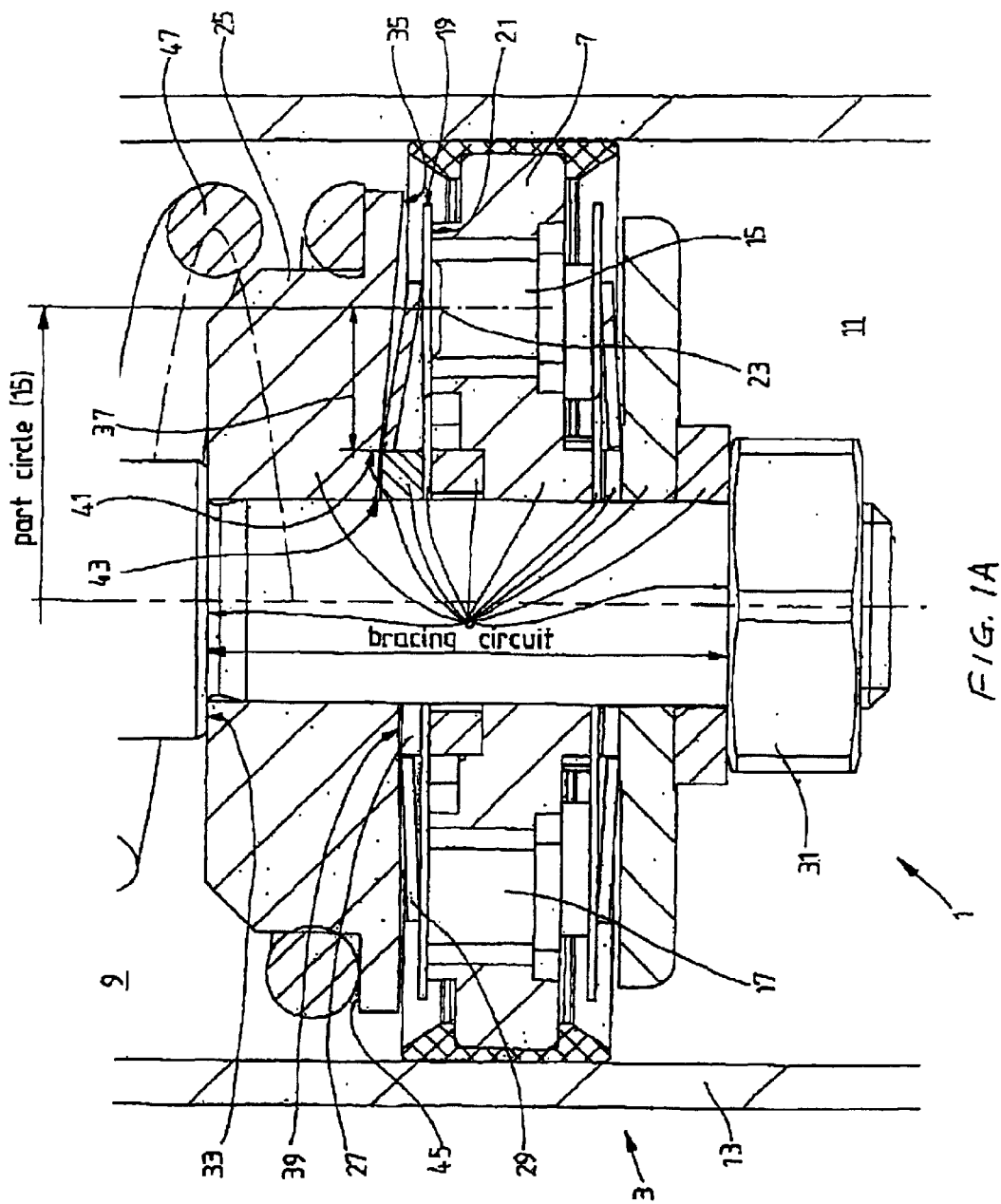
FIG. 1A is an enlarged section of FIG. 1 showing the cone profile exaggerated.

FIG. 1A shows the angle of free cut 43 exaggerated so that the contact circle 41 defining the inner end of lever arm 37 is apparent.

When a separate support disk is not desired, this support disk can also be formed integrally with the tensioning plate. The profile is then formed in the direction of the valve disk.

The profile at the tensioning plate is easily visible. For this reason, the tensioning plate has a contour which makes the installation position immediately obvious. The tensioning plate is constructed as a spring plate 45 for a stop spring 47 on the side remote of the valve disk.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A damping valve for a shock absorber, said damping valve comprising a valve body having at least one through-flow channel and a valve seat surface, a valve disk seated on said valve seat surface and loaded away from said channel by a flow of damping medium, a support disc arranged on the valve disk opposite said valve body, and a tensioning plate which loads said support disk toward said valve disk, wherein said valve body, said valve disk, said support disk and said tensioning plate forming a bracing circuit having a plurality of contact surfaces, at least one of said contact surfaces being profiled so that said support disk contacts said tensioning plate on a contact circle which determines a lever arm extending from said contact circle to an effective radius on which pressure is applied by said damping medium, said at least one of said contact surfaces having a free cut that accommodates any inaccuracies in the shape of the components in the bracing circuit.

2. A damping valve as in claim 1 wherein said profile is provided on said tensioning plate.

3. A damping valve as in claim 1 wherein said profile is conical.

4. A damping valve as in claim 3 wherein said conical profile has an angle of less than one degree.

5. A damping valve as in claim 1 wherein said tensioning plate forms a stop surface for the valve disk.

6. A damping valve as in claim 1 wherein said tensioning plate is formed by a one step process.

7. A damping valve as in claim 1 wherein said tensioning plate comprises a spring plate for supporting a spring opposite said valve disk.

* * * * *